(12) United States Patent
Hultqvist et al.

(10) Patent No.: US 11,115,619 B2
(45) Date of Patent: Sep. 7, 2021

(54) ADAPTIVE STORAGE BETWEEN MULTIPLE CAMERAS IN A VIDEO RECORDING SYSTEM

(71) Applicant: Axis AB, Lund (SE)

(72) Inventors: Sebastian Hultqvist, Lund (SE); Bjorn Berglund, Lund (SE)

(73) Assignee: Axis AB, Lund (SE)

( * ) Notice: Subject to any disclaimer, the term of this patent is extended or adjusted under 35 U.S.C. 154(b) by 65 days.

(21) Appl. No.: 16/717,916

(22) Filed: Dec. 17, 2019

(65) Prior Publication Data

US 2020/0204757 A1 Jun. 25, 2020

(30) Foreign Application Priority Data

Dec. 21, 2018 (EP) .................................. 18215008

(51) Int. Cl.
| | |
|---|---|
| *H04N 5/77* | (2006.01) |
| *H04N 5/76* | (2006.01) |
| *G06F 17/18* | (2006.01) |
| *G06T 1/00* | (2006.01) |
| *H04N 7/18* | (2006.01) |

(52) U.S. Cl.
CPC ............... *H04N 5/76* (2013.01); *G06F 17/18* (2013.01); *G06T 1/0007* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 8,594,182 B1 | 11/2013 | Pardue | |
| 2010/0208064 A1* | 8/2010 | Liu | ................ G08B 13/19667 348/143 |
| 2012/0114314 A1 | 5/2012 | Pashkevich et al. | |
| 2014/0108587 A1 | 4/2014 | Goldberg et al. | |
| 2016/0124667 A1 | 5/2016 | Lee et al. | |
| 2017/0150036 A1* | 5/2017 | Shirani | ................... H04N 7/18 |
| 2017/0280102 A1 | 9/2017 | Burke | |
| 2017/0322958 A1 | 11/2017 | Stute | |

FOREIGN PATENT DOCUMENTS

| | | |
|---|---|---|
| EP | 3340245 A1 | 6/2018 |
| EP | 3396961 A1 | 10/2018 |
| WO | 2009/153920 A1 | 12/2009 |

OTHER PUBLICATIONS

Extended European Search Report dated Jun. 11, 2019 for the European Patent Application No. 18215008.6.

* cited by examiner

*Primary Examiner* — Eileen M Adams
(74) *Attorney, Agent, or Firm* — Volpe Koenig

(57) ABSTRACT

A method and apparatus for storing video data includes three or more cameras and a storage space. The storage space is partitioned into an initial set of allotted portions for storing video data captured by the video cameras. A video quality value is set for encoding video by each camera, and it is periodically determined whether maintaining the video quality value would cause the camera to exceed the allotted portion of storage space. If it is determined that the amount of video data for a camera exceeds its allotment of space, the video quality is reduced. If it is determined that the video quality from a camera falls below a quality threshold, the storage space is re-partitioned into which increased storage space is allotted to the camera having a video quality that falls below the threshold value, and decreased storage space is allotted to at least one other camera.

14 Claims, 5 Drawing Sheets

ADAPTIVE STORAGE BETWEEN MULTIPLE CAMERAS IN A VIDEO RECORDING SYSTEM

BACKGROUND

The present invention relates to video recording systems, and more specifically, to storage of video data recorded by one or more cameras in a video recording system.

In digital video systems, such as network camera monitoring systems, matching data storage capabilities to storage requirements has taken on increased importance with the introduction of high definition video and network cameras. Many challenges arise when attempting to provide sufficient storage of days or weeks, or in some cases even months or years, to meet demands in a cost-effective manner. The cost of storage is typically a significant part of the cost of the digital video system, and therefore system owners have a desire to keep storage capacity down, while at the same time keeping the quality of the video as good as possible.

Typically, a long term average bitrate is used to control a quality parameter of the cameras, in order to make the captured data from the cameras in the system fit into predetermined storage sizes, over a specified time period. In general, this approach is very advantageous for controlling the bitrate. However, if the long term average bit rate is set too low, this can lead to bad quality parameters being obtained for some cameras, as the scene they capture may be more vivid and include more motion than anticipated when the system was initially set up and the long term average bit rate may have been inaccurately estimated. Conversely, if the long term average bit rate is set too high, there will be a significant amount of storage space that is not used efficiently, as cameras may capture scenes with little or no movement at an unnecessarily high quality or bit rate, and it might even be possible to run out of storage space. For at least these reasons, there is a need for improved methods for estimating storage needs and for storing video data in a digital video system.

SUMMARY

It would be desirable to provide techniques for storing video data in a surveillance system including three or more cameras and a storage service comprising a storage space, in such a way that the storage space is used as efficiently as possible between the different cameras. This is set forth in a method, a storage controller, a computer program product, a camera, and a network video recorder.

According to a first aspect, a method for storing video data in a surveillance system includes three or more cameras and a storage service comprising a storage space.

The method comprises:
partitioning the storage space into an initial set of allotted portions for storing video data captured over a time period from each of the three or more video cameras;
for each camera, setting a video quality value for encoding video captured by the camera;
determining, for each camera and at discrete time intervals, whether maintaining the video quality value would cause the camera to output an expected amount of video data that would exceed the allotted portion of storage space for the camera over the time period;
in response to determining for at least one camera that the expected amount of video data would exceed the allotted portion of storage space, adjusting the video quality value to a video quality value representing a reduced video quality relative to the video quality represented by the current video quality value; and
in response to determining that the video quality value from a camera represents a video quality that falls below a video quality represented by a video quality threshold value, re-partitioning the storage space into a new set of allotted portions, wherein increased storage space is allotted to the camera having a video quality that falls below the video quality represented by a video quality threshold value and decreased storage space is allotted to at least one other camera.

This provides a way of sharing a common storage space between several cameras and selecting a desired video quality for each camera. If it turns out after some time that one of the cameras need to use more storage space than it was originally assigned, in order to maintain its desired video quality, the claimed methods makes it possible to examine whether any other cameras is enable to give up some allotted storage space without risking a desired quality level and if so whether some of the storage space assigned to such camera could be allotted to the camera requiring more storage space. This makes it possible to use the shared storage space as efficiently as possible and allows all cameras to maintain their desired video quality, typically without any manual intervention of a system administrator.

According to one embodiment, the allotted portions in the initial set of allotted portions have the same size. By initially partitioning the shared storage space such that all cameras get the same storage space, the system starts at an "even footing" at the outset, and generally a smaller amount of space will need to be redistributed compared to if there were large discrepancies in the amount of storage space assigned to the respective cameras. This also causes the entire system to "stabilize" quicker compared to a situation where larger amounts of storage space would need to be reassigned in between the different cameras.

According to one embodiment, partitioning the storage space into an initial set of allotted portions is done based on a statistical estimation relating to one or more of features of the video data: resolution, coding, initial quality parameters and frame rate, and retention time. By taking these parameters into account when doing the initial partitioning of the storage space, it is more likely that an appropriately sized storage space would be assigned to each camera compared to a scenario in which no such considerations were made.

According to one embodiment, the video quality value is represented by a quantization parameter value. This is a well-known way of representing video quality to those having ordinary skill in the art, and makes it intuitive to integrate various aspects of the disclosure hereinafter into existing video systems.

According to one embodiment, the video quality value is individually set and adjusted for each camera. This allows the system to be flexible, such that cameras capturing busy scenes can do so with a high quality using high bitrate (and thereby accuracy) compared to cameras capturing scenes with little or no activity.

According to one embodiment, the time period is defined by a moving time window representing at least one day. That is, rather than capturing video during a time period that is defined by a firm start date and a firm end date, the time period is continuously evolving and can be, for example, the past 30 days, the past week, the past year, etc. This increases the stability of the system, as the estimation of needed storage space can be ongoing, rather than coming to an abrupt stop at the end date and then needing to be started again "from scratch" at the next start date.

According to one embodiment, the discrete time intervals can range from approximately seconds to approximately hours. That is, the determination of how the storage space should be distributed can occur essentially continuously. However, the determination can also occur less frequently (i.e., hourly), for example, in situations where there is insignificant change in the scenes that are monitored by the cameras, and in situations where computational resources may be scarce.

According to one embodiment, each camera has an associated retention time for storing the video data captured by the camera. That is, an administrator can decide on a camera-by-camera basis how long to keep video recorded by the camera. In some situations, there may be legal or business requirements, for example, that dictate how long video can be saved. In situations when different cameras within a system have different storage requirements, different retention times may be set, thereby increasing the flexibility of the system.

According to one embodiment, the initial video quality value is set manually by a system administrator. In many cases, the cameras themselves can set their own video quality values or have a default quality value. However, there may also be situations in which these automatic settings need to be overridden, and in such situations it is advantageous to have the ability of a system administrator to manually set the initial video quality values.

According to one embodiment, the initial video quality value is set automatically by the camera, based on the specific surveillance scene captured by the camera. Having the ability to automatically set the video quality value based on the specific surveillance scene facilitates the administration of the system and can also improve the accuracy, as the cameras may detect specific details in the surveillance scene that a person might otherwise inadvertently have overlooked.

According to a second aspect, the storage controller for controlling storing of video data in a surveillance system includes three or more cameras and a storage service comprising a storage space. The system includes a storage partitioning module, a quality value setting module, and a determining module. The storage partitioning module is arranged to partition the storage space into an initial set of allotted portions for storing video data captured over a time period from each of the three or more video cameras. The quality value setting module is arranged to set, for each camera, a video quality value for encoding video captured by the camera. The determining module, arranged to: for each camera and at discrete time intervals, determine whether maintaining the video quality value would cause the camera to output an expected amount of video data that would exceed the allotted portion of storage space for the camera over the time period; in response to determining for at least one camera that the expected amount of video data would exceed the allotted portion of storage space, adjust the video quality value to a video quality value representing a reduced video quality relative to the video quality represented by the current video quality value; and in response to determining that the video quality value from a camera represents a video quality that falls below a video quality represented by a video quality threshold value, re-partition the storage space into a new set of allotted portions, wherein increased storage space is allotted to the camera having a video quality that falls below the video quality represented by a video quality threshold value and decreased storage space is allotted to at least one other camera. The storage controller advantages correspond to those of the method and may be varied similarly.

According to a third aspect, a computer program for storing video data in a surveillance system includes three or more cameras and a storage service comprising a storage space. The computer program contains instructions corresponding to the steps of:

partitioning the storage space into an initial set of allotted portions for storing video data captured over a time period from each of the three or more video cameras;

for each camera, setting a video quality value for encoding video captured by the camera;

determining, for each camera and at discrete time intervals, whether maintaining the video quality value would cause the camera to output an expected amount of video data that would exceed the allotted portion of storage space for the camera over the time period;

in response to determining for at least one camera that the expected amount of video data would exceed the allotted portion of storage space, adjusting the video quality value to a video quality value representing a reduced video quality relative to the video quality represented by the current video quality value; and in response to determining that the video quality value from a camera represents a video quality that falls below a video quality represented by a video quality threshold value, re-partitioning the storage space into a new set of allotted portions, wherein increased storage space is allotted to the camera having a video quality that falls below the video quality represented by a video quality threshold value and decreased storage space is allotted to at least one other camera.

According to a fourth aspect, a camera comprising a storage controller as described above has advantages corresponding to those of the method and may be varied similarly.

According to a fifth aspect, a network video recorder comprising a storage controller has advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
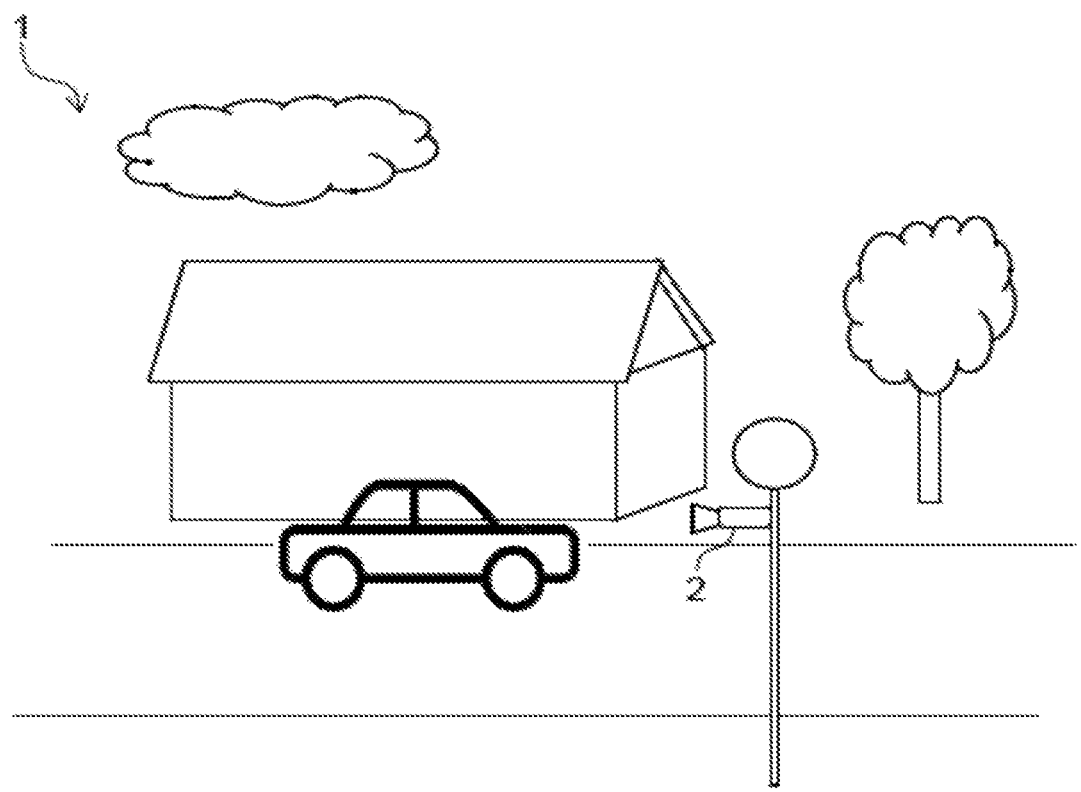
FIG. 1 shows is a perspective view of a scene monitored by a camera, in accordance with one embodiment.

The various embodiments pertain to techniques for efficiently storing video data in a central repository of a digital video system that includes multiple cameras. At a high level, the techniques used herein can be described as changing a quality parameter used in the encoding of video recorded by one or more cameras in the digital video system in response to detecting that the current quality parameters for the cameras might result in insufficient storage space for the recorded video. If the video quality goes below a set threshold value, the shared storage space in the central repository is redistributed between the cameras, such that a minimum video quality can be maintained for the cameras.

According to the various embodiments, a quality parameter for each camera is checked periodically to see whether the quality of the video currently being recorded by the camera is too low. The quality parameter can be checked in a number of ways. For example, in one embodiment, the value of the quality parameter can be made available through an application programming interface (API). In another embodiment, the quality parameter value can be determined by decoding the recorded video. If the quality parameter for a camera is below a minimum threshold level, the system redistributes the storage capacity between the cameras to provide more storage space for the camera with the too low quality parameter. The increased storage capacity assigned to this camera will then make it possible to increase the quality parameter, such that the camera can save video of a higher quality. Expressed differently, a set amount of storage space is automatically segmented between a number of cameras in such a way that the needs of each camera and each surveillance situation is met, without the video quality going below a specified threshold value for any of the cameras.

The following example can be used illustrate the general principles of the various embodiments. Assume a video digital video system includes five cameras, each having 20 GB of storage space to its disposal in a central repository. After recording video for a while, the cameras have used their 20 GB as follows:
Camera A: 10 GB
Camera B: 15 GB
Camera C: 20 GB
Camera D: 20 GB
Camera E: 20 GB As can be seen, cameras C, D, and E are now fully using their allotted storage and are creating an optimal experience with their scene and the available storage. However, cameras A and B still have 10 GB and 5 GB, respectively, of available extra storage in their allotments. That is, there is an extra 15 GB of storage space that could be used by some other cameras. The question is then to decide how this extra storage should be distributed between the cameras.

In one embodiment, this problem is solved by each camera reporting its QP (Quantization Parameter) value, that is, how hard the camera must reduce the quality of its video to make its budget. As is well-known to those having ordinary skill in the art, the QP parameter regulates how much spatial detail is saved. More specifically, the QP parameter controls the amount of compression for every Macroblock in a frame. Large QP values mean that there will be higher quantization, more compression, and lower quality. Lower values mean the opposite, i.e., lower quantization, lower compression, and higher quality. As is well known to those having ordinary skill in the art, QP values are typically in the range of 0-51. In the present example, it is assumed that the default QP value for each camera is set to 30, for purposes of illustration and ease of explanation. Other QP values are of course also possible.

Next, assume the QP values reported by cameras C, D and E are as follows (cameras A and B can be ignored as they are not using their allotted storage space):
Camera C: QP value=30
Camera D: QP value=35
Camera E: QP value=45

From these numbers, it can be concluded that camera C actually is balanced, as it is recording video with the originally specified quality, and does therefore not need more storage space. Camera D has a somewhat degraded video quality, and could benefit from some additional storage space. Camera E, on the other hand, has a high QP value, and would benefit from a significant amount of additional storage space in order to meet its target QP value of 30. Therefore, the system is rebalanced the system with the following settings:
Camera A: 10 GB
Camera B: 15 GB
Camera C: 20 GB
Camera D: 22 GB
Camera E: 33 GB This redistribution of storage space enables each camera to hit its target storage and target QP value, while at the same time not exceeding the available 100 GB of storage space in the central repository. In one embodiment, if it is not possible for the system to repartition the storage space such that the target QP value of 30 is met, the system may instead attempt to increase the overall target QP value (i.e., slightly lower the overall video quality). For example, the system may attempt repartition the storage space to reach a target QP value of 31 instead of 30 for the cameras. It should be noted that the numbers used in this example are just for purposes of illustration, and that in a real-life implementation, they may vary significantly from this example. The various embodiments will now be explained in further detail with reference to the drawings.

Figure 2:
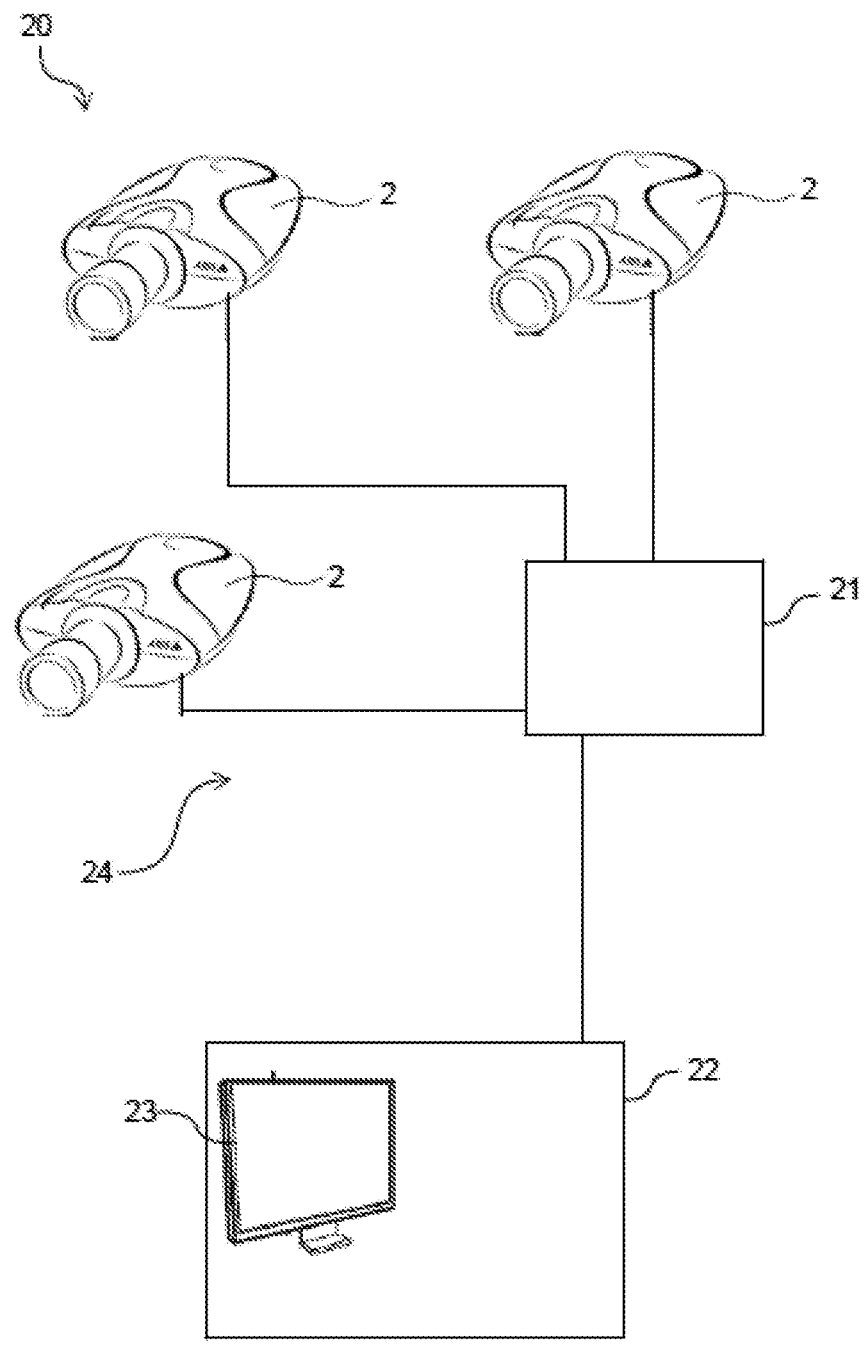
FIG. 2 is a diagram of a camera system, in accordance with one embodiment.

FIG. 1 shows a schematic view of a scene 1, which is monitored by a camera 2. FIG. 2 shows a schematic view of a camera system 20, of which the camera 2 in FIG. 1 is a part. The camera system 20 includes several cameras 2, a network video recorder 21, and a user station 22 including a display 23. The camera system 20 further includes a network 24 connecting the cameras 2 to the network video recorder 21 and also connecting the cameras 2, and the network video recorder 21 to the user station 22. The network 24 can be wired or wireless, and it can be, e.g., a cellular network. Different parts of the network may use the same or different network technologies. For instance, the cameras 2 can be connected to the network video recorder 21 using wires, and the connection to the user station can be wireless.

In some use cases, the user station 22 can be arranged geographically close to the cameras 2 and the network video recorder 21, e.g., in the same building. In other use cases, the user station 22 may be arranged remotely. In some cases, the camera system 20 is geographically spread out, such that one or more cameras are arranged in one location, (e.g. in a shop in one town), while one or more other cameras are located elsewhere (e.g., in different shop in different town). The user station 22 can be a physical device or a system of devices. For instance, the user station 22 can be a personal computer with a display, located in a control center where an operator can watch captured video sequences in real time or from recordings. Alternatively, or additionally, the user station can be a mobile device, such as a smartphone.

Figure 3:
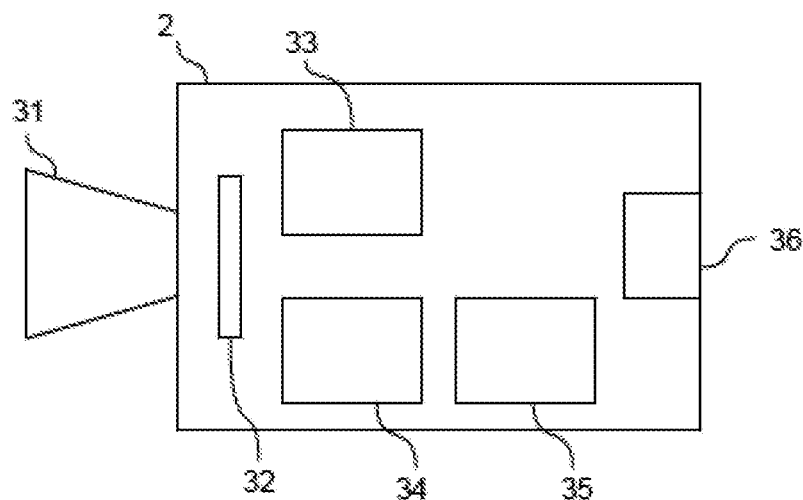
FIG. 3 is a block diagram of a camera in the system of FIG. 2, in accordance with one embodiment.

FIG. 3 shows a simplified block diagram of the camera 2. As can be seen in FIG. 3, the camera 2 has a lens 31, an image sensor 32, a bitrate controller 33, an encoder 34, a local storage 35, and a network interface 36. As will be appreciated by the skilled person, the camera 2 has additional components, but as these are not necessary for the explanation of the various embodiments, they are not included in the drawings, and will not be further discussed.

By means of the lens 31 and the image sensor 32, the camera 2 captures images of the scene 1. The images are encoded by the encoder 34 to form a stream of encoded image frames. The bitrate controller 33 sets the QP value, which is input to the encoder 34, in order to ensure that the encoder 34 delivers the desired bitrate. The QP value can be set either automatically or by a system administrator, as will be explained in more detail later. The local storage 35 may, e.g., be an SD card, and may optionally be used for storing encoded image frames locally in the camera before sending them to central storage. By means of the network interface 36, the camera 2 can transmit encoded image frames to the network video recorder 21 and/or to the user station 22.

Figure 4:
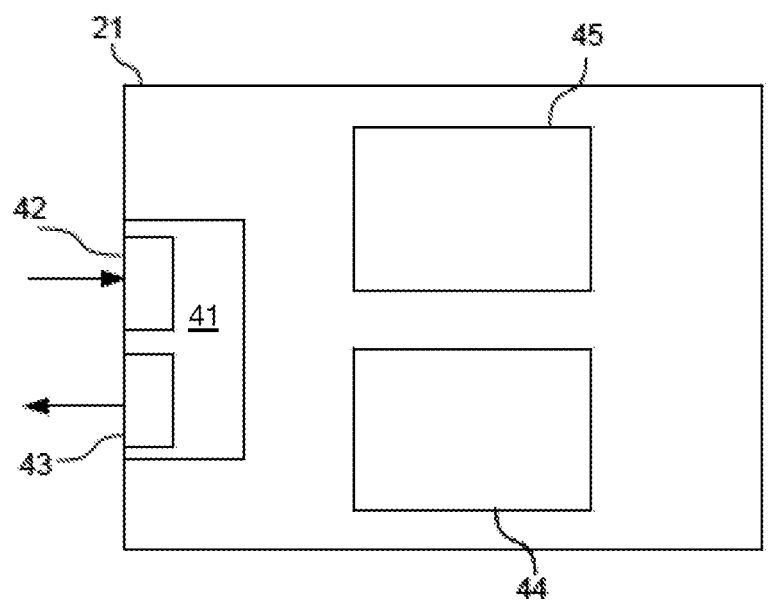
FIG. 4 is a block diagram of a network video recorder in the system of FIG. 2, in accordance with one embodiment.

FIG. 4 shows a simplified block diagram of the network video recorder 21. The network video recorder 21 has a network interface 41 with an input 42 for connection to the cameras 2 in the camera system 20, and an output 43 for connection to the user station 22. Further, the network video recorder 21 has a storage unit 44 and a bitrate controller 45. The storage unit 44 may, for instance, be a disk drive. As with the bitrate controller 33 of the camera 2, the function of the bitrate controller 45 of the network video recorder will be described further later on. The network video recorder 21 may have other components as well, but as these are not necessary for explaining the present embodiments, they are not shown in the drawing and will not be further discussed.

Figure 5:
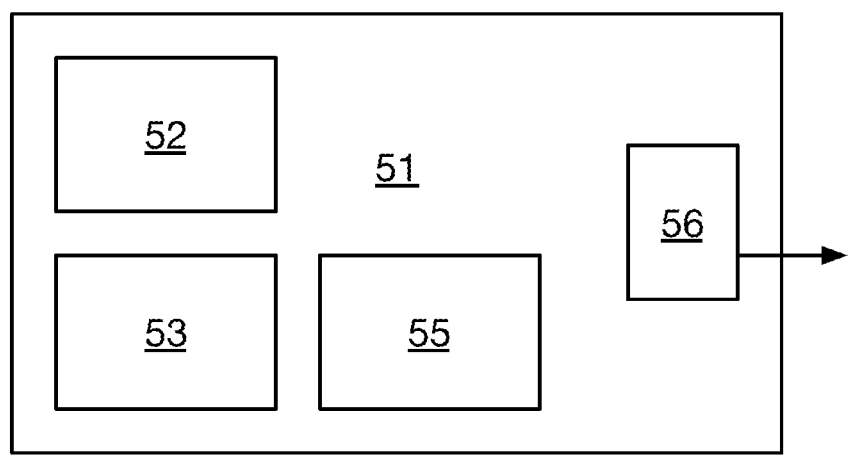
FIG. 5 is a block diagram of a bitrate controller in the system of FIG. 2, in accordance with one embodiment.

In FIG. 5, a simplified box diagram of a bitrate controller 51 is shown. The bitrate controller 51 can be a standalone unit, connectable to the camera 2 and/or the network video recorder 21. Alternatively, the bitrate controller 51 can be integrated in the camera 2, thereby taking the place of the bitrate controller 33 shown in FIG. 3, or it can be integrated in the network video recorder 21, thereby taking the place of the bitrate controller 45 shown in FIG. 4. Regardless of the location of the bitrate controller 51, it has essentially the same components and operates in essentially the same way. Thus, the following description of the bitrate controller 51 shown in FIG. 5 also applies to the bitrate controller 33 of FIG. 3 and the bitrate controller 45 of FIG. 4.

The bitrate controller 51 has a budget setter 52, which is arranged to set a long-term bit budget, based on a desired QP value and the storage space allotted to the camera in the central repository. The long-term bit budget sets a limit to the number of bits that may be output over a certain time period, such as one or more days, by a video encoder that is controlled by the bitrate controller 51, to ensure that the storage space allotted to the camera is not exceeded over the time period. In one embodiment, the budget setter 52 continuously monitors the used budget and estimates whether it is likely to hit its limit. In other embodiments, the monitoring can also be done periodically. If the budget is likely to be exceeded, the bitrate controller 51 raises the QP parameter value for an extended time period (such as hour to weeks) to match the long-term bit budget. If the budget setter 52 discovers that the budget will be undershot, the bitrate controller 51 lowers the QP parameter value until the target QP parameter value is reached, or the budget does not allow for lower QP value.

The video encoder can be integrated in a camera, such as the encoder 34 shown in FIG. 3. However, such a video encoder can also be arranged in various other ways. For instance, the video encoder can be a separate unit that is operatively connected to a camera, or it may be included in a network video recorder, such as the network video recorder 21 shown in FIG. 4. In a network video recorder, a video encoder can be used for transcoding video data. Thus, encoded image frames can be received from one or more cameras, decoded in the encoder of the network video recorder, and once more encoded before storage in the network video recorder or transmission to a user station. An encoder for transcoding can also be arranged in or at the user station.

The bitrate controller 51 further comprises a bit restriction determinator 53, which is configured to determine an instantaneous bit restriction for output of the video encoder. The instantaneous bit restriction applies to a significantly shorter time period than the long-term bit budget, and may for instance be the available bandwidth for transmission from the video encoder.

The bitrate controller 51 further comprises a bitrate calculator 55. The bitrate calculator 55 is configured to calculate an output bitrate that is to be met by the video encoder, and that takes into account the QP value, the long-term bit budget and allotted storage space.

A control output 56 of the bitrate controller 51 is configured to output the calculated output bitrate to the video encoder. In this manner, the video encoder can be instructed with an output bitrate that it is allowed to use to ensure that the long-term bit budget and available storage space is respected, thereby guaranteeing a desired retention time, and to ensure that shorter-term restrictions on bitrate, such as available bandwidth, are also respected, such that transmission of encoded image frames is possible at all times. It should be noted that at least in some embodiments, the initial QP parameter value is not always respected. For example, as described above, if the storage space cannot be repartitioned in a satisfactory way, the QP parameter value may be increased.

As will be discussed further below, the output bitrate may be recalculated at regular (or possibly irregular) intervals, such that control of the video encoder may be dynamic and the QP value does not exceed (i.e., the quality of the video falls below) a pre-determined threshold value. The bitrate controller 51 may be embodied in hardware, firmware, software, or any combination thereof.

Figure 6:
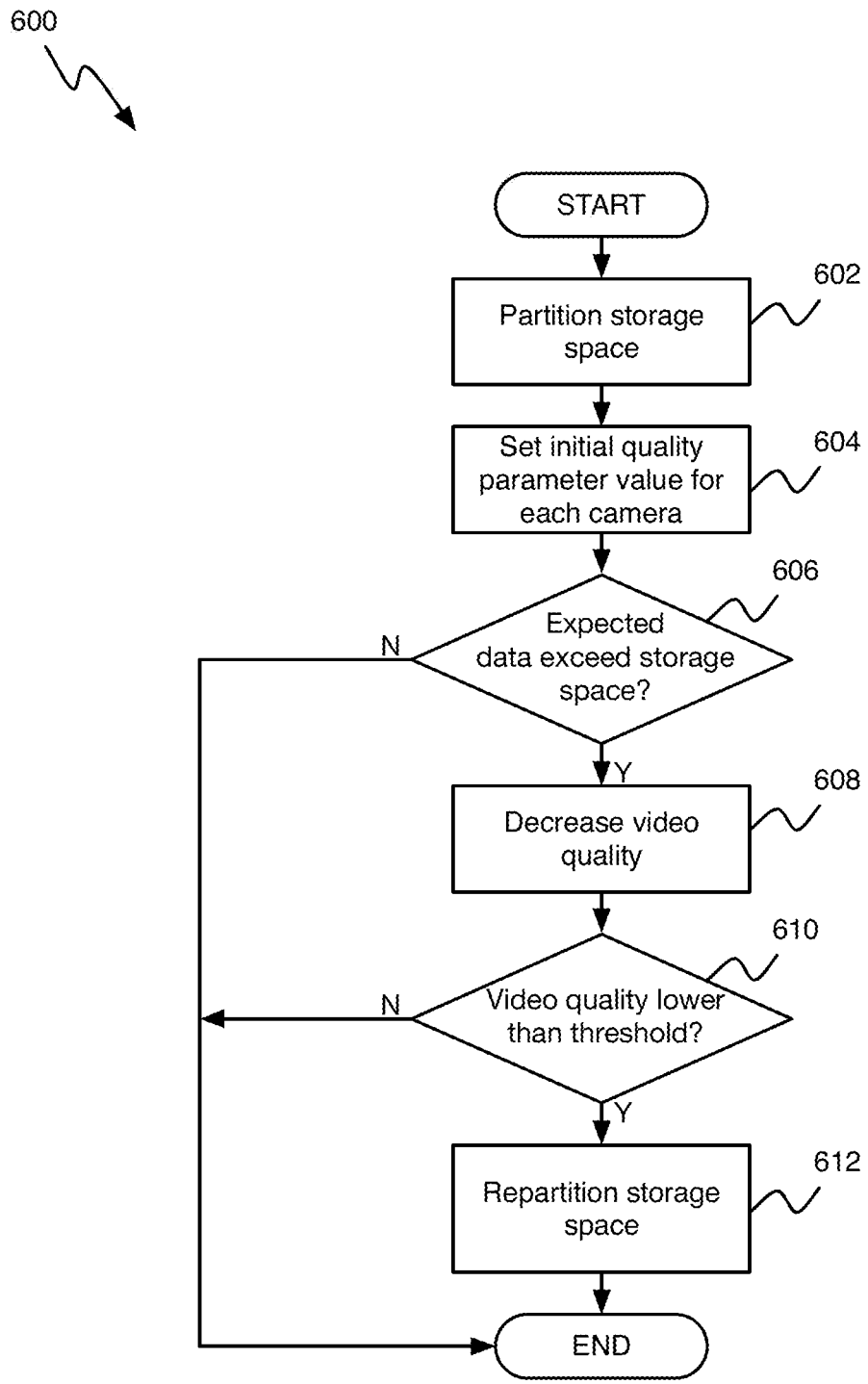
FIG. 6 is a flow chart of a method 600 for storing video data in a surveillance system, in accordance with one embodiment.

FIG. 6 shows a flow chart of a method 600 for storing video data in a surveillance system, in accordance with one embodiment. This method 600 can, for instance, be performed in a surveillance system including three or more cameras and a storage service that includes a storage space, as described above. As can be seen in FIG. 6, the method 600 starts by partitioning the storage space into an initial set of allotted portions for storing video data captured over a time period from each of the three or more video cameras (step 602). This time period is often referred to as the "retention time" and typically refers to a "moving time window," rather than fixed dates, for example, video should be saved for the most recent 30 days, rather than from January 1-31, say, and then beginning again from scratch on February 1. Typically, the length of the time window is at least one day, and often it might be weeks, months or even a year long. It should be noted that, depending on the specific implementation of the system, the different cameras may all have the same retention time, or that the retention time may vary between different cameras, for example, so that cameras that monitor a higher security scene may have longer retention time whereas cameras that monitor a lower security scene may have shorter retention time for their recorded video.

In many cases, the initial set of allotted portions all have the same size, as it is often not known when the system is first set up which among the cameras will need the most storage space. Of course, there may also be situations in which a system administrator knows or suspects that certain cameras may need more storage space than others, in which case different amounts of storage space can be allotted to different cameras.

Typically, when the initial set of allotted portions are assigned, it is done based on a statistical estimation, which relates to different features of the video data, such as resolution, coding, initial quality parameters and frame rate, and retention time. There are many ways to make such estimates, which are apparent to those having ordinary skill in the art. In some embodiments, lookup tables can be used, which have been created by collecting empirical data from multiple cameras over a large number of projects and in a large variety of environments. For example, a user may state "I want 24 h recording, 30 fps busy scene and 1080p framerate, and I use infrared light at night." Using these input parameters, the system can consult a lookup table and conclude that the user would need 100 GB storage per week of video or similar. It should be noted that this is merely a hypothetical example for purposes of illustration, and all the numbers may vary based on the specific circumstances at hand.

Next, an initial quality parameter value is set for each camera (step 604). The initial quality parameter value is set to allow video of a sufficient quality to be saved in the space allotted to the camera. As was mentioned above, the video quality value is often expressed as a Quality Parameter (QP) value, which is inversely proportional to the quality of the video, i.e., a high QP value corresponds to low video quality and vice versa. It should be noted that the QP value can be set to the same number for each camera, or that the different cameras may have different QP values, based on the scene they record, the desired retention time for the video, etc. In one embodiment, the initial QP value is set to 30 for all cameras. The QP value can be set manually by a system administrator, or in some implementations, it can be set by the camera itself, either as a default value for the camera, or based on the scene that the camera is capturing, for example. It should be noted that in some embodiments, the user may not set the actual QP parameter value, but instead be asked to choose a value between 0 and 100, say, which is subsequently converted by the system into a QP parameter value. Choosing a value between 0 and 100 may be conceptually easier for an end user, and may thus result in a better user experience.

After allotting storage space and setting initial QP values, the system determines, for each camera and at discrete time intervals, whether maintaining the video quality value would cause the camera to output an expected amount of video data that would exceed the allotted portion of storage space for the camera over the time period (step 606). The frequency with which this determination is made can vary depending on the particular implementation and the environment in which the system is used. Typically, the determination is made somewhere in the range of every second to every minute, making the determination essentially continuous, but the determination could also be done hourly or even daily, depending on the particular circumstances at hand.

If it is determined in step 606 that no camera will produce an expected amount of video data that would exceed the allotted portion of storage space for the requested retention time, no action is taken and the process ends. On the other hand, if it is determined in step 606 that at least one of the cameras will produce an expected amount of video data that would exceed the allotted portion of storage space for the requested retention time, the QP value of that camera is increased such that the quality of the video is reduced compared to the current quality (step 608).

After adjusting the QP value, the system checks whether the adjusted QP value for the camera has been increased so much that it exceeds a predetermined threshold value for the camera (step 610). Typically, such a threshold value has been set by the administrator beforehand, and it represents a lowest acceptable video quality for the particular surveillance situation monitored by the camera. As was described above, the threshold value is usually set on a system level (e.g., a QP value of 30), but it can be changed for individual cameras, for example, if different cameras have different video quality needs (e.g., higher quality images needed for face recognition, or higher frame rate for traffic applications).

If it is determined that the QP value does not exceed the threshold value, i.e., that the adjusted video quality still is acceptable and that there is enough room to save the video in the allotted storage space, then no further action is taken and the process ends. However, if the QP value exceeds the threshold value, then the storage space is re-partitioned into a new set of allotted portions (step 612), in such a way that increased storage space is allotted to the camera having a QP value that exceeds its threshold value, and decreased storage space is allotted to at least one of the other cameras, which ends the process 600.

How the redistribution of storage space is done can vary depending on the particular implementation. As a general rule of thumb, however, the system first attempts to determine how much extra space would be needed by the camera that does not have sufficient storage space, in order for the camera to be able to store video of sufficient quality over the retention period. Once this need has been determined, the system checks which other cameras have unused storage space in their allotments, as described above, and attempts to re-distribute any such unused space to the camera needing more storage space. If it is not possible to meet the needs of the camera, then the system attempts to see whether the quality of the video from the other cameras can be reduced (without going below the minimum video quality for these cameras) and thereby free up even more space which could be allotted to the camera needing more space. Then, based on these determinations, storage space is re-allotted between the cameras in the system.

It should be noted that a person having ordinary skill in the art can find various types of algorithms for repartitioning storage space. For example, in the above example, the storage on cameras D and E (which both have degraded video quality) could first be evenly split, and then wait and see. After a while, this might result in camera D having more storage than needed, and then in a subsequent step some of the storage assigned to camera D could instead be reassigned to camera E, just to mention one possible alternative implementation.

It should be noted that while the techniques described herein can work on a system with only two cameras, they are ore advantageously implemented in systems that have at least three cameras. The main reason for this is that this provides extra flexibility, for example, in that for some cameras (e.g., two cameras) the allotted storage space can be modified, while for some cameras (e.g., a third camera) the allotted storage space can remain unchanged from its originally allotted storage space. This provides a much more granular control of the system, as individual QP values can be changed, as opposed to changing a "global" QP value and lowering the video quality for all cameras in a system. In addition, having at least three cameras also makes it possible to add different amounts of storage space from, say, camera 2 and camera 3 to camera 1, rather than having a one-to-one relationship as would be the case, were there only two cameras in the system.

As the skilled reader realizes, as a consequence of using the above described techniques, after some time, the entire video system as a whole becomes "balanced" in the sense that each camera ends up operating at an optimal level, i.e., with optimized image quality and storage requirements with respect to the other cameras in the system. If an optimal algorithm is used, the system is typically capable of balancing itself within approximately 1-3 loops. If a more "naïve" algorithm is used, the system typically balances itself within approximately 10 loops. Furthermore, the more storage space that is available, the easier it is to find a solution where all requirements are meet. For example, if there were 110 GB instead of 100 GB available in the example above, it would be easier find a correct solution where every camera hits a desired QP parameter value of 30. It should also be noted that if a scene monitored by a camera changes for a substantial amount of time, then it would be necessary to rebalance the system. A typical example of such a scenario would be a camera recording an empty office space, and then later recording an office space full of people.

It should also be noted that while the various embodiments have been described in the context of redistributing storage space based on estimations of how much storage space each camera will need over a certain time period and at a certain quality setting, these techniques can be applied also in other contexts. For example, if storage is added or removed from the system for various reasons, space can be re-allotted in accordance with the principles described above.

It should be noted that the images encoded by the encoder may be received directly from the capturing camera, or they may have been captured earlier and stored before they are transmitted to the image processing unit. Thus, the immediate source of the images may be an image sensor or a data file.

The camera may be any kind of camera, such as a camera capturing visible light, a camera capturing NIR (near infrared) radiation, a thermal camera, or any type of video producing device, such as, a screen capture software application, a software application that mixes video and other types of metadata in the same video stream (burnt in metadata), or a radar that produces a radar image in the H.264 stream. The camera is advantageously a digital camera, but it may instead be an analog camera connected to a digitalization unit. The various embodiments have been described in the context of monitoring cameras, sometimes referred to as surveillance cameras, but it may be used to advantage also in other camera applications.

The network video recorder has been described as a physical device, but it may instead be a cloud service. Although the camera system has been shown as including a network video recorder, it is entirely possible to arrange a camera system without a network video recorder. In such a system, storage may occur locally in the cameras and/or remotely, such as in a control center. In some embodiments, there may be a combination of local storage and external VMS storage. It should also be noted that the principles can also be employed within a single camera that is equipped with multiple sensors and stores data from the different sensors in a local memory, such as an SD card, within the camera.

While the above described embodiments are focused on video systems that have a central storage unit, in some embodiments, the camera 2 shown in the drawings and described above includes a local storage 35, which can be used for backup and redundancy. In some camera systems, no local storage is included in the cameras, and only the network video recorder or other external storage is used.

Recording or storage of video may be performed continuously, but in many cases it is advantageous to store video only when triggered by an event, such as video motion detection or input from an alarm device, such as a PIR sensor. In this way, storage capacity may be saved by storing only potentially interesting video sequences and not storing video when nothing is happening in the scene.

Encoded image frames may be continuously transmitted to the user station, but also this may be limited by event triggering. In some video systems, encoded image frames may be continuously transmitted to a control center, for storage and/or immediate viewing by an operator, and it may additionally be transmitted to a mobile device only based on event triggering, such that a user may be alerted when something happens in the scene.

The local storage in the camera may be used for so called fail-over recording. This means that if encoded image frames are normally continuously transmitted from the camera, local storing may commence if connection to the network is lost. Once network connection is restored, the video data stored in the local storage may be transmitted to the user station, and a complete video sequence may be restored.

The encoder may operate in accordance with any encoding standard employing motion estimation and motion compensation. The encoder may, for instance be a block-based hybrid encoder, such as an H.264, H.265, or VP9 encoder.

It should also be noted that in some embodiments, the camera might compress different parts of the image differently, for example, as done in the "Zipstream" technique, developed by Axis Communications AB of Lund, Sweden. When using various embodiments in combination with Zipstream, the initial QP parameter value can be used as a start value for the picture as a whole, and then parts of the image that are not considered "important" for whatever reason, can be assigned a higher QP parameter value (i.e., lower video quality). When using different amounts of compression for different parts of an image, the threshold QP value is typically set such that the areas of the image that are considered to have "most interesting" content determine what the QP threshold value should be.

The present embodiments may comprise a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing video data in a surveillance system including three or more cameras and a storage service comprising a storage space, the method comprising:
   partitioning the storage space into an initial set of allotted portions for storing video data captured over a time period from each of the three or more video cameras, wherein each allotted portion in the initial set of allotted portions is configured to store video data from one camera of the three or more cameras;
   for each camera, setting a video quality value for encoding video captured by the camera;
   determining, for each camera and at discrete time intervals, whether maintaining the video quality value would cause the camera to output an expected amount of video data that would exceed the allotted portion of storage space for the camera over the time period;

in response to determining for at least one camera that the expected amount of video data would exceed the allotted portion of storage space, adjusting the video quality value to a video quality value representing a reduced video quality relative to the video quality represented by the current video quality value; and in response to determining that the reduced video quality value from a camera represents a video quality that falls below a video quality represented by a video quality threshold value, re-partitioning the storage space into a new set of allotted portions, wherein increased storage space is allotted to the camera having a video quality that falls below the video quality represented by a video quality threshold value and decreased storage space is allotted to at least one other camera.

2. The method of claim 1, wherein the allotted portions in the initial set of allotted portions have the same size.

3. The method of claim 1, wherein partitioning the storage space into an initial set of allotted portions is done based on a statistical estimation relating to one or more of features of the video data: resolution, coding, initial quality parameters and frame rate, and retention time.

4. The method of claim 1, wherein the video quality value is represented by a quantization parameter value.

5. The method of claim 1, wherein the video quality value is individually set and adjusted for each camera.

6. The method of claim 1, wherein the time period is defined by a moving time window representing at least one day.

7. The method of claim 1, wherein the discrete time intervals range from approximately seconds to approximately hours.

8. The method of claim 1, wherein each camera has an associated retention time for storing the video data captured by the camera.

9. The method of claim 1, wherein the initial video quality value is set manually by a system administrator.

10. The method of claim 1, wherein the initial video quality value is set automatically by the camera, based on the specific surveillance scene captured by the camera.

11. A storage controller for controlling storing of video data in a surveillance system including three or more cameras and a storage service comprising a storage space, the storage controller comprising:

a storage partitioning module arranged to partition the storage space into an initial set of allotted portions for storing video data captured over a time period from each of the three or more video cameras, wherein each allotted portion in the initial set of allotted portions is configured to store video data from one camera of the three or more cameras;

a quality value setting module arranged to set, for each camera, a video quality value for encoding video captured by the camera;

a determining module, arranged to:

for each camera and at discrete time intervals, determine whether maintaining the video quality value would cause the camera to output an expected amount of video data that would exceed the allotted portion of storage space for the camera over the time period;

in response to determining for at least one camera that the expected amount of video data would exceed the allotted portion of storage space, adjust the video quality value to a video quality value representing a reduced video quality relative to the video quality represented by the current video quality value; and in response to determining that the reduced video quality value from a camera represents a video quality that falls below a video quality represented by a video quality threshold value, re-partition the storage space into a new set of allotted portions, wherein increased storage space is allotted to the camera having a video quality that falls below the video quality represented by a video quality threshold value and decreased storage space is allotted to at least one other camera.

12. A computer program product for storing video data in a surveillance system including three or more cameras and a storage service comprising a storage space, the computer program product comprising a computer readable storage medium having program instructions embodied therewith, the program instructions being executable by a processor to cause the processor to perform a method comprising:

partitioning the storage space into an initial set of allotted portions for storing video data captured over a time period from each of the three or more video cameras;

for each camera, setting a video quality value for encoding video captured by the camera, wherein each allotted portion in the initial set of allotted portions is configured to store video data from one camera of the three or more cameras;

determining, for each camera and at discrete time intervals, whether maintaining the video quality value would cause the camera to output an expected amount of video data that would exceed the allotted portion of storage space for the camera over the time period;

in response to determining for at least one camera that the expected amount of video data would exceed the allotted portion of storage space, adjusting the video quality value to a video quality value representing a reduced video quality relative to the video quality represented by the current video quality value; and in response to determining that the reduced video quality value from a camera represents a video quality that falls below a video quality represented by a video quality threshold value, re-partitioning the storage space into a new set of allotted portions, wherein increased storage space is allotted to the camera having a video quality that falls below the video quality represented by a video quality threshold value and decreased storage space is allotted to at least one other camera.

13. A camera comprising a storage controller for controlling storing of video data in a surveillance system including three or more cameras and a storage service comprising a storage space, the storage controller comprising:

a storage partitioning module arranged to partition the storage space into an initial set of allotted portions for storing video data captured over a time period from each of the three or more video cameras, wherein each allotted portion in the initial set of allotted portions is configured to store video data from one camera of the three or more cameras;

a quality value setting module arranged to set, for each camera, a video quality value for encoding video captured by the camera;

a determining module, arranged to:

for each camera and at discrete time intervals, determine whether maintaining the video quality value would cause the camera to output an expected amount of video data that would exceed the allotted portion of storage space for the camera over the time period;

in response to determining for at least one camera that the expected amount of video data would exceed the allotted portion of storage space, adjust the video quality value to a video quality value representing a reduced video quality relative to the video quality represented by the current video quality value; and in response to determining that the reduced video quality value from a camera represents a video quality that falls below a video quality represented by a video quality threshold value, re-partition the storage space into a new set of allotted portions, wherein increased storage space is allotted to the camera having a video quality that falls below the video quality represented by a video quality threshold value and decreased storage space is allotted to at least one other camera.

14. A network video recorder comprising a storage controller for controlling storing of video data in a surveillance system including three or more cameras and a storage service comprising a storage space, the storage controller comprising:

a storage partitioning module arranged to partition the storage space into an initial set of allotted portions for storing video data captured over a time period from each of the three or more video cameras, wherein each allotted portion in the initial set of allotted portions is configured to store video data from one camera of the three or more cameras;

a quality value setting module arranged to set, for each camera, a video quality value for encoding video captured by the camera;

a determining module, arranged to:

for each camera and at discrete time intervals, determine whether maintaining the video quality value would cause the camera to output an expected amount of video data that would exceed the allotted portion of storage space for the camera over the time period;

in response to determining for at least one camera that the expected amount of video data would exceed the allotted portion of storage space, adjust the video quality value to a video quality value representing a reduced video quality relative to the video quality represented by the current video quality value; and in response to determining that the reduced video quality value from a camera represents a video quality that falls below a video quality represented by a video quality threshold value, re-partition the storage space into a new set of allotted portions, wherein increased storage space is allotted to the camera having a video quality that falls below the video quality represented by a video quality threshold value and decreased storage space is allotted to at least one other camera.

* * * * *